(12) United States Patent
Stoll et al.

(10) Patent No.: US 9,875,483 B2
(45) Date of Patent: Jan. 23, 2018

(54) CONVERSATIONAL INTERFACES

(71) Applicant: Wal-Mart Stores, Inc., Bentonville, AR (US)

(72) Inventors: Nathan Stoll, San Francisco, CA (US); Jan Magnus Stensmo, Foster City, CA (US); Stuart Robinson, Berkeley, CA (US)

(73) Assignee: WAL-MART STORES, INC., Bentonville, AR (US)

(*) Notice: Subject to any disclaimer, the term of this patent is extended or adjusted under 35 U.S.C. 154(b) by 795 days.

(21) Appl. No.: 13/986,607

(22) Filed: May 16, 2013

(65) Prior Publication Data
US 2013/0311592 A1    Nov. 21, 2013

Related U.S. Application Data

(60) Provisional application No. 61/648,564, filed on May 17, 2012, provisional application No. 61/648,566, (Continued)

(51) Int. Cl.
*G06F 15/16* (2006.01)
*G06Q 30/02* (2012.01)
(Continued)

(52) U.S. Cl.
CPC ..... *G06Q 30/0214* (2013.01); *G06Q 30/0631* (2013.01); *G06Q 30/0635* (2013.01);
(Continued)

(58) Field of Classification Search
CPC .......................... H04L 29/06; H04L 29/08072
(Continued)

(56) References Cited

U.S. PATENT DOCUMENTS

| 5,550,576 A | 8/1996 | Klosterman |
| 5,983,004 A | 11/1999 | Shaw et al. |

(Continued)

FOREIGN PATENT DOCUMENTS

| JP | 2004/326634 | 11/2004 |
| JP | 2007/249833 | 9/2007 |

(Continued)

OTHER PUBLICATIONS

"Propagation of Trust and Distrust." Guha, R.; Kumar, Ravi; Raghavan, Prabhakar; Tomkins, Andrew. WWW '04 Procedding of the 13th International Conference on World Wide Web. pp. 403-412. Mar. 2004.

(Continued)

*Primary Examiner* — Khanh Dinh
(74) *Attorney, Agent, or Firm* — Bryan Cave LLP

(57) ABSTRACT

In accordance with some implementations, a method for responding to requests submitted through a conversational interface is disclosed. The method is performed on a server system having one or more processors and memory storing one or more programs for execution by the one or more processors. The server system receives a request from a user through a conversational interface. The server system determines, based on the request, whether the system is able to fulfill the request automatically. In accordance with a determination that the system is able to fulfill the request automatically, the server system fulfills the user request with no human interaction. In accordance with a determination that the system is not able to fulfill the request without human intervention, the server system sends the request to a human operator for fulfillment.

18 Claims, 7 Drawing Sheets

Related U.S. Application Data filed on May 17, 2012, provisional application No. 61/648,569, filed on May 17, 2012, provisional application No. 61/648,578, filed on May 17, 2012, provisional application No. 61/648,582, filed on May 17, 2012, provisional application No. 61/648,588, filed on May 17, 2012, provisional application No. 61/648,591, filed on May 17, 2012, provisional application No. 61/688,655, filed on May 18, 2012.

(51) Int. Cl.
*G06Q 50/00* (2012.01)
*H04L 29/08* (2006.01)
*G06Q 30/06* (2012.01)
*H04W 4/20* (2009.01)
*H04L 12/58* (2006.01)

(52) U.S. Cl.
CPC ......... *G06Q 30/0641* (2013.01); *G06Q 50/01* (2013.01); *H04L 29/08072* (2013.01); *H04L 51/32* (2013.01); *H04L 67/10* (2013.01); *H04L 67/306* (2013.01); *H04W 4/206* (2013.01)

(58) Field of Classification Search
USPC .............................. 709/203, 220, 228, 230
See application file for complete search history.

(56) References Cited

U.S. PATENT DOCUMENTS

| | | | |
|---|---|---|---|
| 6,185,221 B1 | 2/2001 | Aybay | |
| 6,912,588 B1* | 6/2005 | Jardin | H04L 29/06 709/238 |
| 7,092,381 B2 | 8/2006 | Carlsson et al. | |
| 7,330,895 B1 | 2/2008 | Horvitz | |
| 7,831,439 B1 | 11/2010 | Bryar et al. | |
| 7,925,542 B2 | 4/2011 | Shah | |
| 8,064,342 B2* | 11/2011 | Badger | H04L 45/00 370/230 |
| 8,095,521 B2 | 1/2012 | Chan et al. | |
| 8,170,897 B1 | 5/2012 | Cohen et al. | |
| 8,224,823 B1 | 7/2012 | Amacker | |
| 8,407,765 B2* | 3/2013 | Wiley | H04L 41/0896 726/2 |
| 8,612,208 B2* | 12/2013 | Cooper | G06F 17/30672 704/9 |
| 8,626,604 B1 | 1/2014 | Gandhi | |
| 8,739,016 B1 | 5/2014 | Goldman et al. | |
| 8,775,529 B2* | 7/2014 | Wright | H04L 51/36 709/204 |
| 8,935,192 B1 | 1/2015 | Ventilla et al. | |
| 8,976,665 B2* | 3/2015 | Wiley | H04L 29/06027 370/235 |
| 9,094,257 B2* | 7/2015 | Morrill | H04L 29/06027 |
| 2001/0011235 A1 | 8/2001 | Kim et al. | |
| 2001/0016496 A1 | 8/2001 | Lee | |
| 2002/0099653 A1 | 7/2002 | De Souza et al. | |
| 2003/0046173 A1 | 3/2003 | Benjier | |
| 2003/0054827 A1 | 3/2003 | Schmidl et al. | |
| 2003/0056216 A1 | 3/2003 | Wugofski et al. | |
| 2003/0074253 A1 | 4/2003 | Scheuring et al. | |
| 2003/0149580 A1* | 8/2003 | Moores | G06Q 50/01 705/319 |
| 2003/0188252 A1 | 10/2003 | Kim et al. | |
| 2004/0117482 A1 | 6/2004 | Salazar | |
| 2004/0117860 A1 | 6/2004 | Yi et al. | |
| 2005/0004837 A1 | 1/2005 | Sweeney et al. | |
| 2005/0187883 A1 | 8/2005 | Bishop | |
| 2006/0047598 A1 | 3/2006 | Hansen | |
| 2006/0277591 A1 | 12/2006 | Arnold et al. | |
| 2007/0043583 A1 | 2/2007 | Davulcu et al. | |
| 2007/0143816 A1 | 6/2007 | Gupta et al. | |
| 2007/0199019 A1 | 8/2007 | Angiolillo et al. | |
| 2007/0219880 A1 | 9/2007 | Stone et al. | |
| 2007/0266097 A1 | 11/2007 | Harik et al. | |
| 2008/0065445 A1 | 3/2008 | Livesay et al. | |
| 2008/0271080 A1 | 10/2008 | Gossweiler et al. | |
| 2008/0300940 A1 | 12/2008 | Aravamudan | |
| 2009/0019484 A1 | 1/2009 | Jo et al. | |
| 2009/0106366 A1 | 4/2009 | Virtanen et al. | |
| 2009/0171760 A1 | 7/2009 | Aarnio | |
| 2009/0175214 A1 | 7/2009 | Sfar et al. | |
| 2009/0190544 A1 | 7/2009 | Meylan et al. | |
| 2009/0222873 A1 | 9/2009 | Einarsson | |
| 2009/0228339 A1 | 9/2009 | Wolf et al. | |
| 2009/0234749 A1 | 9/2009 | Fjellanger et al. | |
| 2009/0276284 A1 | 11/2009 | Yost | |
| 2009/0319436 A1 | 12/2009 | Andra et al. | |
| 2010/0049654 A1 | 2/2010 | Pilo | |
| 2010/0235256 A1 | 9/2010 | Kang | |
| 2010/0279618 A1 | 11/2010 | Morton et al. | |
| 2010/0312724 A1 | 12/2010 | Pinckney | |
| 2011/0131106 A1 | 6/2011 | Eberstadt et al. | |
| 2011/0173056 A1 | 7/2011 | D'Alessio et al. | |
| 2011/0225048 A1 | 9/2011 | Nair | |
| 2011/0255448 A1 | 10/2011 | Hartman et al. | |
| 2011/0276377 A1 | 11/2011 | Kim | |
| 2011/0276631 A1 | 11/2011 | Schmitt | |
| 2011/0282941 A1 | 11/2011 | Chan et al. | |
| 2011/0320373 A1 | 12/2011 | Lee et al. | |
| 2012/0005209 A1 | 1/2012 | Rinearson et al. | |
| 2012/0016678 A1 | 1/2012 | Gruber et al. | |
| 2012/0065884 A1 | 3/2012 | Sung et al. | |
| 2012/0109781 A1 | 5/2012 | Felt | |
| 2012/0109792 A1 | 5/2012 | Eftekhari | |
| 2012/0117584 A1 | 5/2012 | Gordon | |
| 2012/0136756 A1 | 5/2012 | Jitkoff et al. | |
| 2012/0163309 A1 | 6/2012 | Ma et al. | |
| 2012/0170534 A1 | 7/2012 | Kim et al. | |
| 2012/0197979 A1 | 8/2012 | Palm | |
| 2012/0203832 A1 | 8/2012 | Vastardis et al. | |
| 2012/0209839 A1 | 8/2012 | Andrews et al. | |
| 2012/0278625 A1 | 11/2012 | Narayanan et al. | |
| 2012/0290399 A1 | 11/2012 | England | |
| 2012/0296978 A1 | 11/2012 | Inoue | |
| 2012/0303425 A1 | 11/2012 | Katzin et al. | |
| 2012/0330980 A1 | 12/2012 | Rubin et al. | |
| 2013/0054407 A1 | 2/2013 | Sabur | |
| 2013/0060625 A1 | 3/2013 | Davis et al. | |
| 2013/0073989 A1 | 3/2013 | Harris | |
| 2013/0094537 A1 | 4/2013 | Hui et al. | |
| 2013/0097056 A1 | 4/2013 | Sun et al. | |
| 2013/0097142 A1 | 4/2013 | Kim et al. | |
| 2013/0124357 A1 | 5/2013 | He et al. | |
| 2013/0178239 A1 | 7/2013 | Roberts et al. | |
| 2013/0179440 A1 | 7/2013 | Gordon | |
| 2013/0291007 A1 | 10/2013 | Shimy et al. | |
| 2013/0332307 A1 | 12/2013 | Linden | |

FOREIGN PATENT DOCUMENTS

| | | |
|---|---|---|
| JP | 2009/123192 | 6/2009 |
| JP | 2011/170471 | 9/2011 |
| KR | 2001/0076971 | 8/2001 |
| KR | 2002/0090816 | 12/2002 |
| KR | 10/0825204 | 4/2008 |
| KR | 2011/0117475 | 10/2011 |
| WO | WO 2010/099632 | 9/2010 |

OTHER PUBLICATIONS

Blake, P. (1997), Exploring the news, Information World Review, (121), 17-18, Retrieved from http:// search.proquest.com/docview/ 199371966?accountid=14753.

Luvocracy Inc, International Search Report and Writtten Opinion, PCT/US2013/041700, dated Sep. 17, 2013, 14 pgs.

Luvocracy Inc., International Search Report and Written Opinion, PCT/US2013/041702, dated Aug. 27, 2013, 12 pgs.

Luvocracy Inc., International Search Report and Written Opinion, PCT/US2013/041705, dated Aug. 27, 2013, 12 pgs.

(56) References Cited

OTHER PUBLICATIONS

Luvocracy Inc., International Search Report and Written Opinion, PCT/US2013/041707, dated Aug. 27, 2013, 10 pgs.
Luvocracy Inc., International Search Report and Written Opinion, PCT/US2013/041714, dated Aug. 27, 2013, 11 pgs.

* cited by examiner

CONVERSATIONAL INTERFACES

RELATED APPLICATIONS

This application is claims priority to the following (1) U.S. Provisional Application Ser. No. 61/648,564, filed May 17, 2012, entitled "Progressively Asking for Increasing Amounts of User and Network Data"; (2) U.S. Provisional Application Ser. No. 61/648,566, filed May 17, 2012, entitled "Conversational Interfaces"; (3) U.S. Provisional Application Ser. No. 61/648,569, filed May 17, 2012, entitled "Universal Communications Infrastructure"; (4) U.S. Provisional Application Ser. No. 61/648,578, filed May 17, 2012, entitled "Trust Graph"; (5) U.S. Provisional Application Ser. No. 61/648,582, filed May 17, 2012, entitled "Universal Consumption Service"; (6) U.S. Provisional Application Ser. No. 61/648,588, filed May 17, 2012, entitled "Reward Structures"; (7) U.S. Provisional Application Ser. No. 61/648,591, filed May 17, 2012, entitled "System and Method for Social Network Based Referrals"; (8) U.S. Provisional Application Ser. No. 61/688,655, filed May 18, 2012, entitled "System and Method for Social Network Based Referrals"; which are incorporated herein by reference in their entirety.

This application is also related to the following (1) U.S. Application Ser. No. 61/648,564, filed May 17, 2012, entitled "Progressively Asking for Increasing Amounts of User and Network Data"; (2) U.S. Application Ser. No. 61/648,569, filed May 17, 2012, entitled "Universal Communications Infrastructure"; (3) U.S. application Ser. No. 13/769,181, filed Feb. 15, 2013, entitled "Trust Graph"; (4) U.S. application Ser. No. 13/896,310, filed, May 16, 2013, entitled "Zero Click Commerce Systems"; (5) U.S. Application Ser. No. 61/648,582, filed May 17, 2012, entitled "Universal Consumption Service"; (6) U.S. Application Ser. No. 61/648,588, filed May 17, 2012, entitled "Reward Structures"; (7) U.S. application Ser. No. 13/896,292, filed May 16, 2013, entitled "Pre-Establishing Purchasing Intent for Computer Based Commerce Systems" entitled "System and Method for Social Network Based Referrals"; which are incorporated herein by reference in their entirety.

TECHNICAL FIELD

The disclosed implementations relate to the field of online services generally and in particular to providing convenient interactions for users.

BACKGROUND

Over the last two decades, the number of online services has increased dramatically. Online services that have emerged include, for example, online commerce services and social networking services. These services open up new experiences for user, including interactions between users and new ways of shopping for goods and services. These services incur a positive network effect as more users sign up and use the service.

A source of inconvenience in the user experience is the provision of information by the user to the online service in order to make full use of the service. The online service asks for a certain amount of information upfront from the user at sign-up, and can subsequently ask for additional information. If the venue asks for too much information too quickly, the user is overwhelmed and becomes less likely to provide the information, less likely to stay with the service, or less likely to sign up for the service in the first place. Another source of inconvenience is the communication interface between the user and the online service. A user can use different modes of communication on any given day. Limiting the user to one mode of communication with the service inconveniences the user and limits the user's interaction with the service. Requesting information from the user without requesting too much too quickly, and providing multiple avenues or modes of communication with users, including avenues that has a conversational feel, make online services more convenient and user-friendly.

SUMMARY

In accordance with some implementations, a method for requesting user data is disclosed. The method is performed on a server system having one or more processors and memory storing one or more programs for execution by the one or more processors. The server system establishes a user profile for a user, the user profile including one or more information items associated with the user. The server system receives a request from the user to access additional services. In response to receiving the user request, the server system requests additional information from the user.

In accordance with some implementations, a server system that requests user data is disclosed. The server system has one or more processors, and memory storing one or more programs to be executed by the one or more processors. The one or more programs include instructions for: establishing a user profile for a user, the user profile including one or more information items associated with the user; receiving a request from the user to access additional services; and in response to receiving the user request, requesting additional information from the user.

In accordance with some implementations, a non-transitory computer readable storage medium storing one or more programs configured for execution by a server system is disclosed. The one or more programs also include instructions for: establishing a user profile for a user, the user profile including one or more information items associated with the user; receiving a request from the user to access additional services; and in response to receiving the user request, requesting additional information from the user.

In accordance with some implementations, a method for responding to requests submitted through a conversational interface is disclosed. The method is performed on a server system having one or more processors and memory storing one or more programs for execution by the one or more processors. The server system receives a request from a user through a conversational interface. The server system determines, based on the request, whether the system is able to fulfill the request automatically. In accordance with a determination that the system is able to fulfill the request automatically, the server system fulfills the user request with no human interaction. In accordance with a determination that the system is not able to fulfill the request without human intervention, the server system sends the request to a human operator for fulfillment.

In accordance with some implementations, a server system responding to requests submitted through a conversational interface is disclosed. The server system has one or more processors, and memory storing one or more programs to be executed by the one or more processors. The one or more programs include instructions for: receiving a request from a user through a conversational interface; determining, based on the request, whether the system is able to fulfill the request automatically; in accordance with a determination that the system is able to fulfill the request automatically, fulfilling the user request with no human interaction; and in accordance with a determination that the system is not able to fulfill the request without human intervention, sending the request to a human operator for fulfillment.

In accordance with some implementations, a non-transitory computer readable storage medium storing one or more programs configured for execution by a client system is disclosed. The one or more programs include instructions for: receiving a request from a user through a conversational interface; determining, based on the request, whether the system is able to fulfill the request automatically; in accordance with a determination that the system is able to fulfill the request automatically, fulfilling the user request with no human interaction; and in accordance with a determination that the system is not able to fulfill the request without human intervention, sending the request to a human operator for fulfillment.

In accordance with some implementations, a method for enabling communication with a user is disclosed. The method is performed on a server system having one or more processors and memory storing one or more programs for execution by the one or more processors. The server system sends communication data to a user using a first communication channel. The server system determines that the user has ceased using the first communication channel for receiving communications. The server system identifies a second communication channel. The server system sends further communication data to the user using the identified second communication channel.

In accordance with some implementations, a server system enabling communication with a user is disclosed. The server system has one or more processors, and memory storing one or more programs to be executed by the one or more processors. The one or more programs include instructions for: sending communication data to a user using a first communication channel; determining that the user has ceased using the first communication channel for receiving communications; identifying a second communication channel; and sending further communication data to the user using the identified second communication channel.

In accordance with some implementations, a non-transitory computer readable storage medium storing one or more programs configured for execution by a server system is disclosed. The one or more programs also include instructions for receiving an indication of intent from a user to purchase a good or service within a specific category. The one or more programs include instructions for: sending communication data to a user using a first communication channel; determining that the user has ceased using the first communication channel for receiving communications; identifying a second communication channel; and sending further communication data to the user using the identified second communication channel.

BRIEF DESCRIPTION OF THE DRAWINGS

Like reference numerals refer to corresponding parts throughout the drawings.

DESCRIPTION OF IMPLEMENTATIONS

Figure 1:
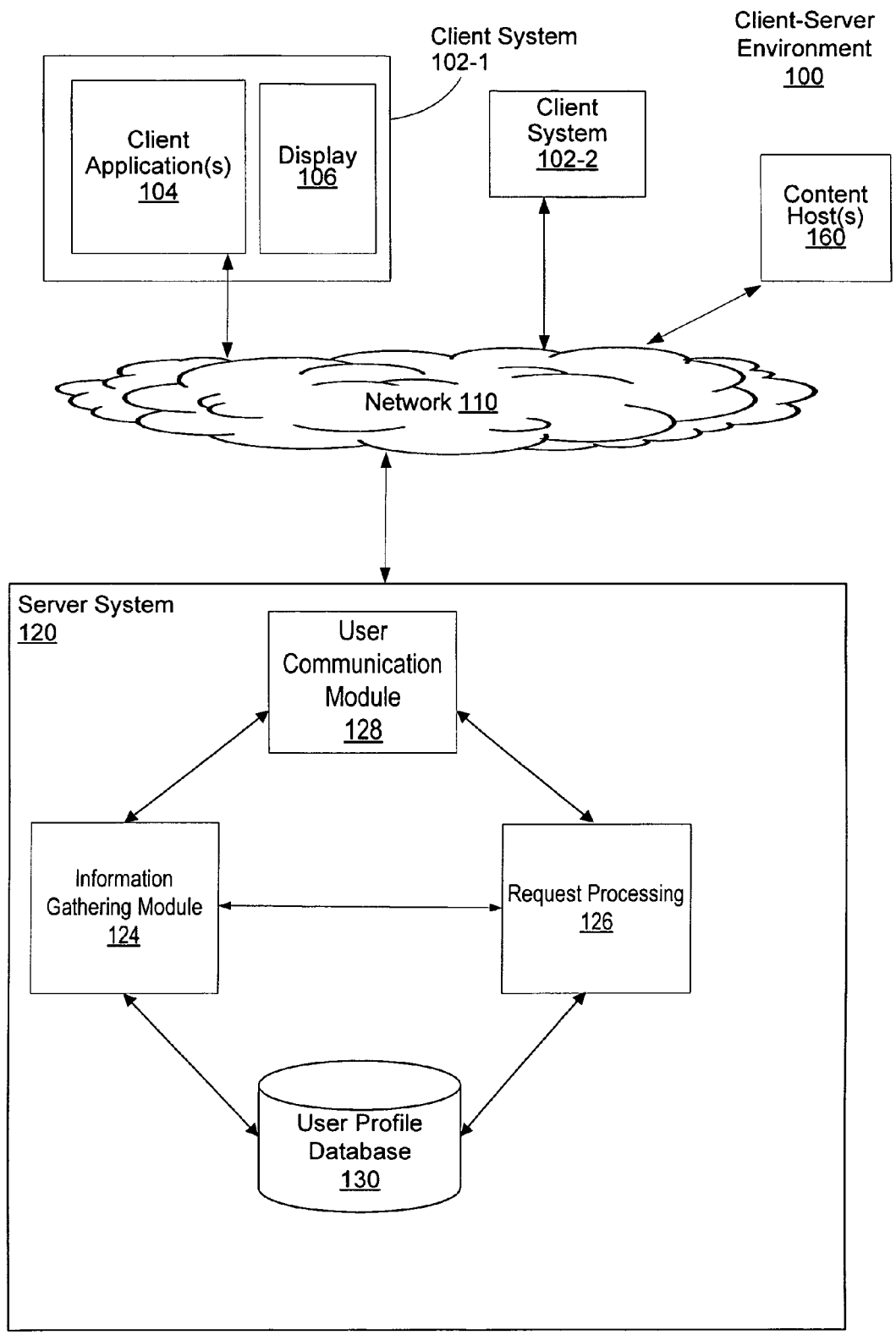
FIG. 1 is a block diagram illustrating a client-server environment in accordance with some implementations.

In some implementations, a server system operates an online service (e.g., an online commerce system). In some implementations, the online service gradually onboards a user while progressively getting more and more data about the user. In some implementations, the online service determines if a user request can be fulfilled automatically, and sends the request to a human operator for fulfillment if the service is unable to fulfill the request automatically. In some implementations, the online service has multiple channels or modes of communications or interaction with the user.

In some implementations, where the online service is an online commerce system, a user can purchase goods or services, accumulate a social network of users of the online service, recommend goods or services to users of the online service, and recommend users to the online service. In some implementations, users of the online service access these features through a web site operated by the online service or through any of multiple modes of communication with the online service (e.g., email to a specified email address).

In some implementations, the server system gradually onboards a user onto the online service while progressively getting more and more data about the user (e.g., requesting the user to provide more information). In some implementations, the server system gets more data about the user by directly asking the user for data, extracting data from elsewhere (e.g., other social networks, publicly accessible online content), or inferring data from other data associated with the user (e.g., inferring data from data already in the user's profile). In some implementations, the server system asks the user to verify extracted or inferred data. In some implementations, the server system asks the user to provide or verify data gradually, such as periodically or when the data is needed to fulfill a user request, as opposed to all at once. The service communicates to the user the reasons the online service is seeking the data. The user can then make an informed decision regarding whether to provide the data or not, or even to have the data removed.

In some implementations, the user signs up for the online service by providing certain information (e.g., a name and/or an email address). With that information, the server system builds a profile of the user, which then can be augmented with additional information.

In some implementations, a new user signs up for the online service through initial introductory communications. For example, a first user is copied on a message sent to the online service by a second user, or a message from the first user to the second user is forwarded to the online service by the second user; the copying or the forwarding implicitly invites the first user to the online service. As another example, the first user is explicitly invited to the online service by the second user (e.g., the second user submits to the online service the first user as an invitee), with the online service sending an invitation message to the first user. The first user signs up for the online service by interacting with the online service (e.g., continuing to participate in the message thread that includes the copied or forwarded message, clicking on a web link in an invitation message). In some implementations, a long-form signup process is omitted for the first user. From the copied or forwarded message, or the invitation from the second user, the server system extracts data about the first user that is used to sign up the first user (e.g., the user's name and/or email address).

In some implementations, the server system of the online service then has a user and at least one social relationship, since the user was invited or recommended by another user. The user is gradually incorporated into more complex social networks within the online service. Any implicit introduction or encounter with another user through the service can progressively allow the user to broaden their social network within the online service. For example, the user invites other users to the online service, and the other users who sign up for the online service becomes part of the inviter user's social network within the online service.

In some implementations, the online service solicits from the user additional information, inviting the user to respond with a diverse array of data types. For example, the online service can prompt a user to provide a profile picture, or various social media user names. The online service may also ask the user to verify data that were extracted or inferred by the online service (e.g., "we believe this might be a picture of you; if it is, respond Yes").

In some implementations, the server system of the online service solicits additional information from the user when the user makes a request to access a service or feature within the online service; the online service solicits the additional information in order to fulfill the user request. For example, when the user invites (e.g., recommends a product to) another user to the online service, the online service display a dialog for direct input of the invitee's contact information, and optionally displays a dialog for authorization to access a third-party service (e.g., a social network outside of the online service). The user is informed in the dialog that the authorization is needed for the online service to access the third-party service, with the benefit of that access being that the user can, for example, import data or invite users from the third-party service to the online service. If the user provides the information for authorization to access the third-party service, the user can specify a user in the third party service as an invitee, and the online service, optionally, links to the user the third-party service account corresponding to the authorization information.

As another example, when the user makes a request within the online service to purchase a good or service, if the user's profile does not already include payment information, the server system solicits payment information (e.g., credit card number, name on credit card, billing address, etc.) from the user in order to fulfill the purchase request.

Continuing with the payment information example, the payment information is stored in the user's profile and can be used to extract or infer further information not already in the user profile. For example, the name on the credit card may be inferred to be the user's real name, and the user is asked by the online service to confirm whether that is the case. The name can also be used to extract additional information (e.g., profession, social network profile, photo, etc.) from external sources (e.g., publicly available content). Upon confirmation by the user, the extracted or inferred information is added to the user profile.

As a user encounters various features in our system, this will trigger requests for additional information. In some implementations, these include authorization dialogues with third party services, or conversational requests/notifications of actions to be responded to.

In some implementations, the online service makes solicitations of information from the user that are not prompted by a user request. For example, the online service periodically asks the user to verify a piece of extracted or inferred information without being prompted by a specific request by the user.

In some implementations, the solicitation of information follows a sequence that is defined by a state machine or decision tree, or the like. The state machine or decision tree defines a sequence or path of information requests based on, for example, what information the online service already has for the user.

In some embodiments, the online service recognizes the following data types:
Email;
Real user name;
Email addresses of friends;
Names of friends;
Interests;
Trusted friends by category;
Demographic information;
Gender;
Family/Relationship situation;
Age;
Education/Occupation;
Location;
Address;
Credit Card;
Phone;
Pictures;
Social network accounts;
Activity history;
Communications; and
Recommendations sent.

In some implementations, the online service offers the same functionality offered in a "web site" through conversational channels. For example, if a user can accomplish a task on a web site, the user can also accomplish the task by communicating with the online service through any of multiple channels.

In some implementations, different users have different preferences in their modes or channels of communication with the online service. Examples of the different modes or channels of communication include a web site, email, messaging (e.g., chat, instant messaging, SMS), social networking posts (e.g., Twitter tweets, status updates or comments in a social network), and voice communication (e.g., telephony).

In some implementations, the flexibility of responding to natural human language comes at a cost because of its varied and open-ended nature. User may believe that they are communicating with a human when in reality they are communicating with a computer. While many requests may be handled automatically, some must be referred to a human administrator.

In some implementations, automation can speed up response rates and eliminate errors and repetitive work. At one end of the automation scale, the online service has a system where a user interacts directly (e.g., through a web site or a mobile app). At the other end, a user communicates with a human administrator. In between, there are other types of communication. These modes or channels of communication may be viewed, at a high level, as filling out forms with the information that is needed for the online service to fulfill user requests. The online service knows what information is needed to fulfill a request, and attempts to get this information as quickly and easily for the user as possible. Thus, the communications between the user and the online service is a conversation of sorts, and the multiple modes or channels of communication between the user and the online service, aggregately, may be viewed as a conversational interface.

In some implementations, some requests are complete (i.e., online service has the information needed to fulfill the request). For example, the information is all included in the request email or filled in a form at a web site of the online service. But some requests have missing pieces of information that needs to be obtained from the user. Other requests may be ambiguous (e.g., the communication making the request is ambiguous) and the online service needs to verify the request with the user to ensure that the request is understood correctly. In some implementations, whether a request can be fulfilled automatically by the online service without the intervention of a human administrator is based on whether the request is ambiguous and/or whether there is information needed to fulfill the request that is missing and that needs to be confirmed in-person.

In some implementations, the obtaining of information needed to complete the request or resolution of an ambiguous request is automated. For example, if a user requests to buy a shoe, but forgets to indicate a size, the online service can automatically ask for the size by sending an email, an SMS, an instant message, or direct a human administrator to call the user. If the online service can detect what is missing automatically, the conversation between the user and the online service can be carried out more quickly. in some implementations, some types of information, if missing, are be sought from the user automatically without human intervention. For example, in the above example, the online service would automatically send a message to the user to get missing shoe size. On the other hand, some types of information, if missing, are sought or confirmed by in-person communications. For example, credit card information and other sensitive information, if missing, are sought or confirmed with, for example, a phone call from a human administrator to the user.

In some implementations, the communications between the online service and the user include use of specific nomenclature that restricts the space of valid responses. This helps reduce the possibility of ambiguity in the communications.

In some implementations, information needed to fulfill a request need not be all included in the communication conveying the request. For example, the online service can retrieve information from the user's profile, if needed, to fulfill the request. For example, if the online service knows a user from previous engagements the online service may already know the user's preferred selections, for example, their shoe size. The online service may then predict that a new purchase will be of the same size, and a communication to the user is sent to verify that the online service has made the correct selection.

In some implementations, the online service adjusts the rate of its communications with the user. For example, by responding quickly when the user is actively responding, the online service increases the likelihood that the user will respond quickly again with further information. But if the user is responding slowly (e.g., time duration between responses above a certain threshold), the online service can assume the user has stepped away from their device and will wait longer before following up further.

In some implementations, any incoming communications from the user to the online service is sent to a specified email address. A communication sent to the specified email address can be about anything a user wants to communicate to the online service, and on the receiving end, the online service processes the communication automatically or with a human administrator, depending on the nature of the communication.

In some implementations, because of the open-ended nature of communication, the online service automatically makes a best guess of what type a communication belongs to based on features in the communication that are extractable by the online service. When an incoming email is a reply to earlier messages, the context of the email in view of the conversation the email belongs to is known. It is more difficult with a communication initiated by a user.

In some implementations, in an online service that is an online commerce system, possible types of incoming messages, that are not replies, include:

Recommendation. The user wants to:
Recommend a product or service in general, also known as a product submission;
Recommend a product or service to another user, a product recommendation;
Request a recommendation in a category; the user wants a suggestion of what to buy from her social network within the online service;
Purchase. The user would like to buy a specified product;
Nomination. The user would like to nominate a user as somebody they trust in a category;
Other. All other email;
Invitation responses;
Feedback and suggestions;
Returns;
Problems that need attention; and
Spam and other irrelevant messages.

In some implementations, the online service has algorithms for the disambiguation of incoming messages. Some are rule-based but others may use machine learning techniques.

In some implementations, for each message type, as disambiguated, the online service follows a process of responding to and handling the message type as if the request in the message had been submitted/taken as an action on a web site of the online service.

In some implementations, the online service allows its users to communicate with the online service and convey requests using natural language and a predefined structure for processing the communications. The structure has, for example, one or more rules for processing communications from users and determining how to proceed. For example, a rule may be that a reply with a specific term conveys a specific type of request. Another rule may be that certain terms are known to be ambiguous, and thus trigger follow-ups for clarification (e.g., follow-up communication soliciting clarification or even human intervention). In the allowance of user communication using natural language and the user of a defined language structure to process the communications, the online service may be considered to be a conversational interface. In general, conversational interfaces are like language oriented state machines, where the states may require very specific structure, or very broad interpretation (e.g., replying "buy" to a tweet kicks off a state flow that results in a purchase). Further, the state flow through the state machine of the conversational interface can be linear or interleaving; just as one can explore a website linearly (e.g., by referencing a sitemap) or in a path-dependent manner where the next page to visit is based on what is in the current page, communications in a conversational interface can have similar properties—a linear flow or an interleaving flow.

In some implementations, multiple channels or modes of communication (e.g., email, social networks, instant messaging, telephony, etc.) are available for communications between users and the online service. Within a conversation thread between the user and the online service, the user can switch modes. For example, the user starts out sending email to the online service, and then switches to instant messaging. The online service detects the change and switches to match the communication channel used by the user.

In some implementations, internal services within the online service communicate with a single interface by specifying a target user combined with a payload of metadata pertaining to the outbound message. The interface receiving this information identifies a set of possible channels for the target user by calling a set of classification services. Once a channel has been identified, it is stored and used for all further communication.

FIG. 1 is a block diagram illustrating a client-server environment 100 in accordance with some implementations. The client-server environment 100 includes one or more client systems 102-1 and 102-2, a server system 120, and one or more vendors 160, all connected over a network 110. In some implementations, the client system 102 includes one or more client applications 104 and a display 106. The server system 120 includes a user communication module 128, an information gathering module 124, a request processing module 126, and a user profile database 130. The network 110 may consist of any one or more of any of a variety of networks, including local area networks (LAN), wide area networks (WAN), wireless networks, wired networks, the Internet, or any combination of such networks.

In accordance with some implementations, the client system 102 includes one or more client applications 104. The one or more client applications 104 include, but are not limited to, a web browsing application for connecting to the server system 120. The client system 102 also includes a display 106. In some implementations, the client system is a computing device with the display integrated directly the device itself, such as a laptop, a smart phone, and a tablet computer. In other implementations the display is connected to, but not integrated into the client system. For example, desktop computer systems often do not have an integrated display and instead connect to a standalone display.

In some implementations, the client system 102 sends communications to and receives communications form the server system 120 over any viable communication medium. For example, a communication can be transmitted via e-mail, text, voice mail, social media message, an instant message, a message through a messaging service internal to the server system, or through the messaging service of another web service or web site.

In some implementations, when the user of the client system 102 replies to a communication from the server system 120, the client system 102 sends the response to the server system 120 via the same communication method that was used to send the replied-to communication. For example, if the original communication was received through an email message, the client system then uses the email messaging system to send a response. In some implementations, the client system 102 uses a different communication method to send a response. For example, the original communication is sent as an instant message through a chat program. Instead of responding through the chat program, the user sends a response via an email.

In accordance with some implementations, the server system 120 includes a user communication module 128, an information gathering module 124, a request processing module 126, and a user profile database 130. The user communication module 128 is configured to send and receive communications with a user, through any communication channel the user selects. The user communications module 128 also determines the user's selected communication channel if the user leaves the previous communication channel, receives requests from users, and receives indication from a user that they are changing their current communication channel.

In some implementations, the user communication module 128 determines the communication method based on past communications with the user of the client system. Thus, the user communication module 128 chooses the communication method that the user of the client system 102 uses most often when communicating with the server system. For example, if a user communicates with the server system 120 through email in 75% of communications, the server system 120 will use an email messaging system to communicate with the user. In some implementations, each user selects a preferred communication method and this preference is stored in the user profile database 130. For example, a user selects text messaging as the preferred method for receiving messages and in response the user communication module 128 will then use text messages to send communications to the user, unless directed otherwise. In some implementations, the user communication module 128 will use multiple communication methods to send communications to the user.

In some implementations, the user communication module 128 chooses the communication method based on the time and date that the communication is to be sent. For example, the user communication module 128 uses email messages to deliver communications during the standard workday (9 am-5 pm Monday through Friday) and uses text messages to deliver communications on the weekend and evenings. In some implementations, no communications will be sent during typical sleeping hours. In some implementations, each user selects time and data preferences for the user communication module 128 to use and these preferences are stored in the user profile database 130.

In some implementations, the user communication module 128 receives responses from client systems 102. In some implementations, each response is transmitted to the request processing module 126. In some other implementations, each response is transmitted to the information gathering module 124 before it is transmitted to the request processing module 126. In yet other implementations, a copy of the response is transmitted to both to the information gathering module 124 and the request processing module 126.

In some implementations, the request processing module 126 receives a request from a user and determining whether the server system 120 can automatically respond to the request without human interaction, and if not, forward the request to a human operator for fulfillment. In some implementations, the request processing module 126 identifies the type of request, identifies the information needed to fulfill the request, and determines whether the server system 120 has the information needed to fulfill the request.

In some implementations, the information gathering module 124 gathers and collects data associated with users. The gathering and collecting of data include asking the user to provide or confirm data, crawling and extracting data from content hosts 160, and analyzing the user profile database 130 to infer additional data. In some implementations, asking of users to provide or confirm data is gradual (e.g., periodic) and/or responsive to user requests.

In some implementations the user profile database 130 contains user profiles for users who have registered to use the service provided by the server system 120. In some implementations, a user profile includes the name, ID, demographic information (gender, age, location, etc), purchasing history, social network information (including username and passwords for one or more social networking sites), and trust information. In some implementations, the user profile includes contact information submitted by the user or stored by the system after contact by the user including but not limited to email addresses, phone numbers, user names, instant message user IDs, and social networking sites user information sufficient to allow the service to access each of the user's social networking sites. In some implementations, the user communication module 128 uses information stored in the user profile database 130 to send communications to the client system 102.

In some implementations, the content hosts 160 host content external to the server system 120. Examples of content host(s) include web sites, social networks, and so on. In some implementations, the information gathering module 124 crawls the content host(s) 160 to gather information associated with users of the server system 120. The crawled information is presented to the respective users for confirmation, and information that is confirmed are stored in the user profile database 130.

Figure 2:
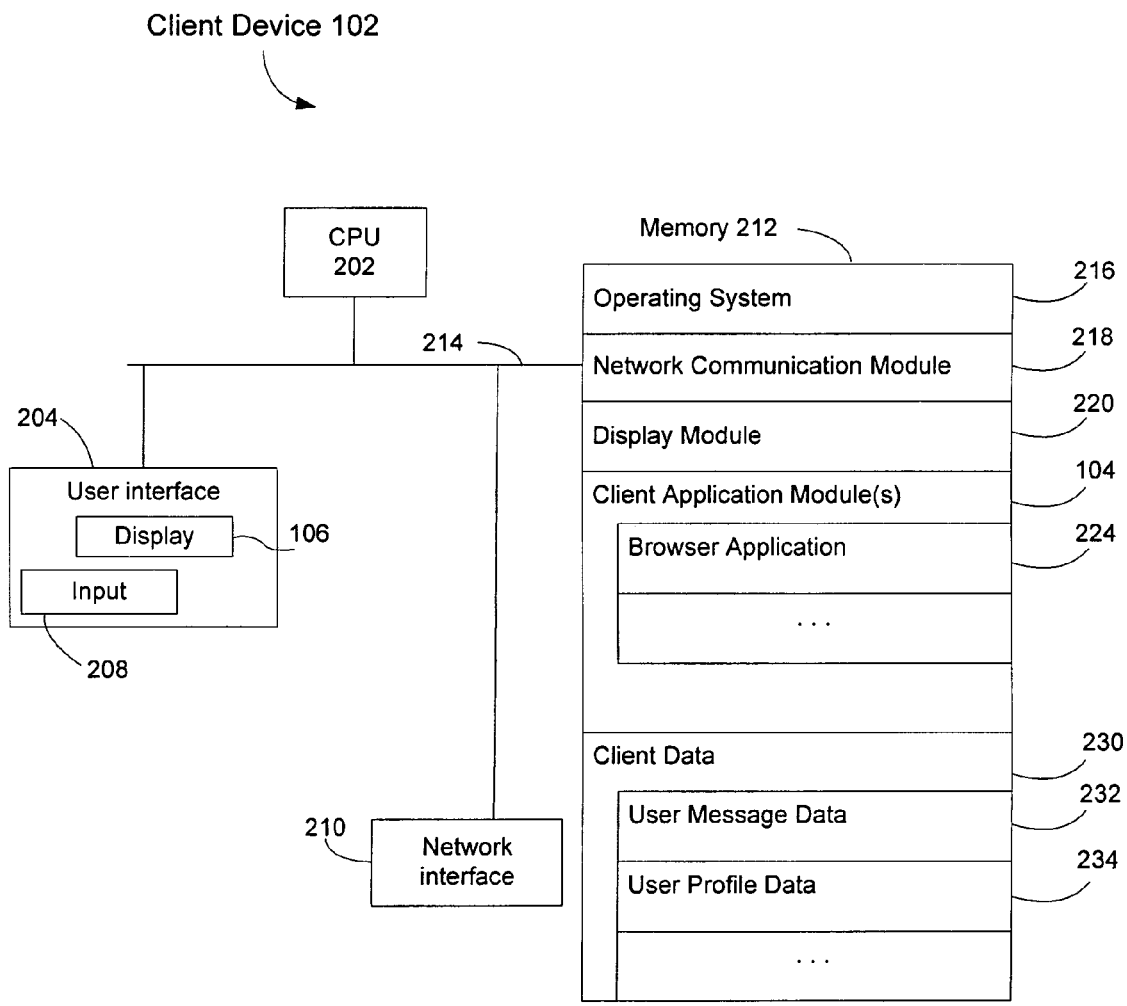
FIG. 2 is a block diagram illustrating a client system in accordance with some implementations.

FIG. 2 is a block diagram illustrating a client system 102, in accordance with some implementations. The client system 102 typically includes one or more processing units (CPUs) 202, one or more network interfaces 210, memory 212, and one or more communication buses 214 for interconnecting these components. The client system 102 includes a user interface 204. The user interface 204 includes an associated display device 106 and optionally includes an input means such as a keyboard, mouse, a touch sensitive display, or other input buttons 208. Optionally, the display device 106 includes an audio device or other information delivery device. Furthermore, some client systems use a microphone and voice recognition to supplement or replace the keyboard.

Memory 212 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, includes a non-transitory computer readable storage medium. In some implementations, memory 212 or the computer readable storage medium of memory 212 stores the following programs, modules and data structures, or a subset thereof:
- an operating system 216 that includes procedures for handling various basic system services and for performing hardware dependent tasks;
- a network communication module 218 that is used for connecting the client system 102 to other computers via the one or more communication network interfaces 210 (wired or wireless) and one or more communication networks, such as the Internet, other wide area networks, local area networks, metropolitan area networks, and so on;
- a display module 220 for enabling display of media content on a display 106 associated with the client system 102;
- one or more client system 102 applications module(s) 104 for enabling the client system 102 to perform the functions offered by the client system 102, including but not limited to:
  - an application 224 for sending and receiving communications to/from a server system (FIG. 1, 120) and displaying the information (for example web pages) returned by the server system (FIG. 1, 120) or a smart phone or other computer system application that performs the same function; and
- one or more client data module(s) 230 for storing data related to the client system 102, including but not limited to:
  - client message data 232, including data representing messages to be sent to the server system (FIG. 1, 120) and messages received from the server system (FIG. 1, 120); and
  - user profile data 234, including information concerning users of the client system 102 such as a user profile, user preferences and interests, user contact information, and other information relevant to providing services to the user.

Figure 3:
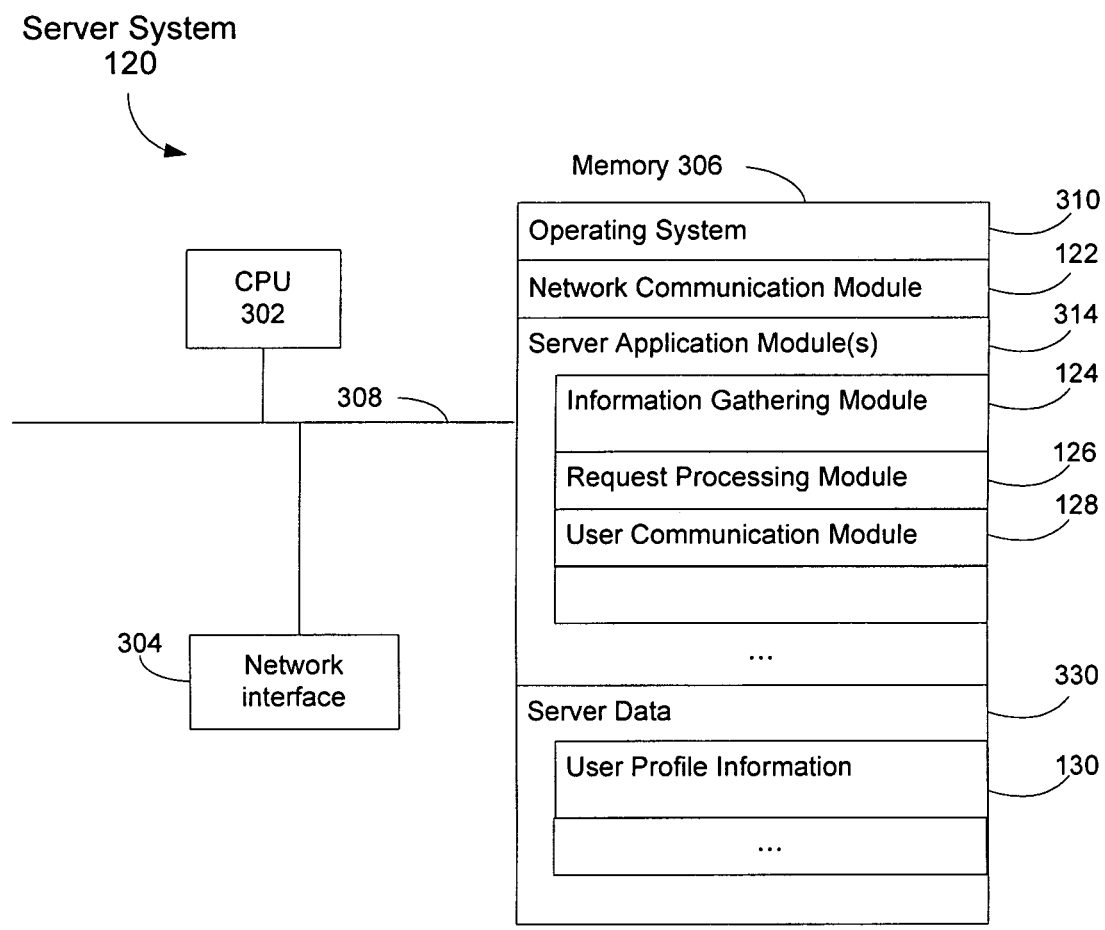
FIG. 3 is a block diagram illustrating a server system in accordance with some implementations.

FIG. 3 is a block diagram illustrating a server system 120, in accordance with some implementations. The server system 120 typically includes one or more processing units (CPUs) 302, one or more network interfaces 304, memory 306, and one or more communication buses 308 for interconnecting these components.

Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternately the non-volatile memory device(s) within memory 306, includes a non-transitory computer readable storage medium. In some implementations, memory 306 or the computer readable storage medium of memory 306 stores the following programs, modules and data structures, or a subset thereof:
- an operating system 310 that includes procedures for handling various basic system services and for performing hardware dependent tasks;
- a network communication module 122 that is used for connecting the server system 120 to other computers via the one or more communication network interfaces 304 (wired or wireless) and one or more communication networks, such as the Internet, other wide area networks, local area networks, metropolitan area networks, and so on;
- one or more server application module(s) 314 for enabling the server system 120 to perform the functions offered by the server system 120, including but not limited to:
  - an information gathering module 124 for gathering and collecting increasing amounts of data for a user, with the user's permission, while also conveying the purpose of the information gathering to the user;
  - a request processing module 126 for receiving a request from a user and determining whether the server system (FIG. 1, 120) can automatically respond to the request without human interaction, and if not, forward the request to a human operator for fulfillment;

a user communication module 128 for communicating with a user, through any communication channel the user selects, determining the users selected determination channel if the user leaves the previous communication channel; receiving requests from users, and receiving indication from a user that they are changing their current communication channel; and one or more server data module(s) 330 for storing data related to the server system 120, including but not limited to:

user profile information database 130 including user preferences and interests, user contact information, and user history, including past user purchases, searches, page views, previous product recommendations, previous product reviews, social connections of the user, users' histories of previous requests, user relationship data, user trust data, user interest data, user payment data, the user's preferred communication channel; the user's current communication channel, and any other information related to the user.

Figure 4:
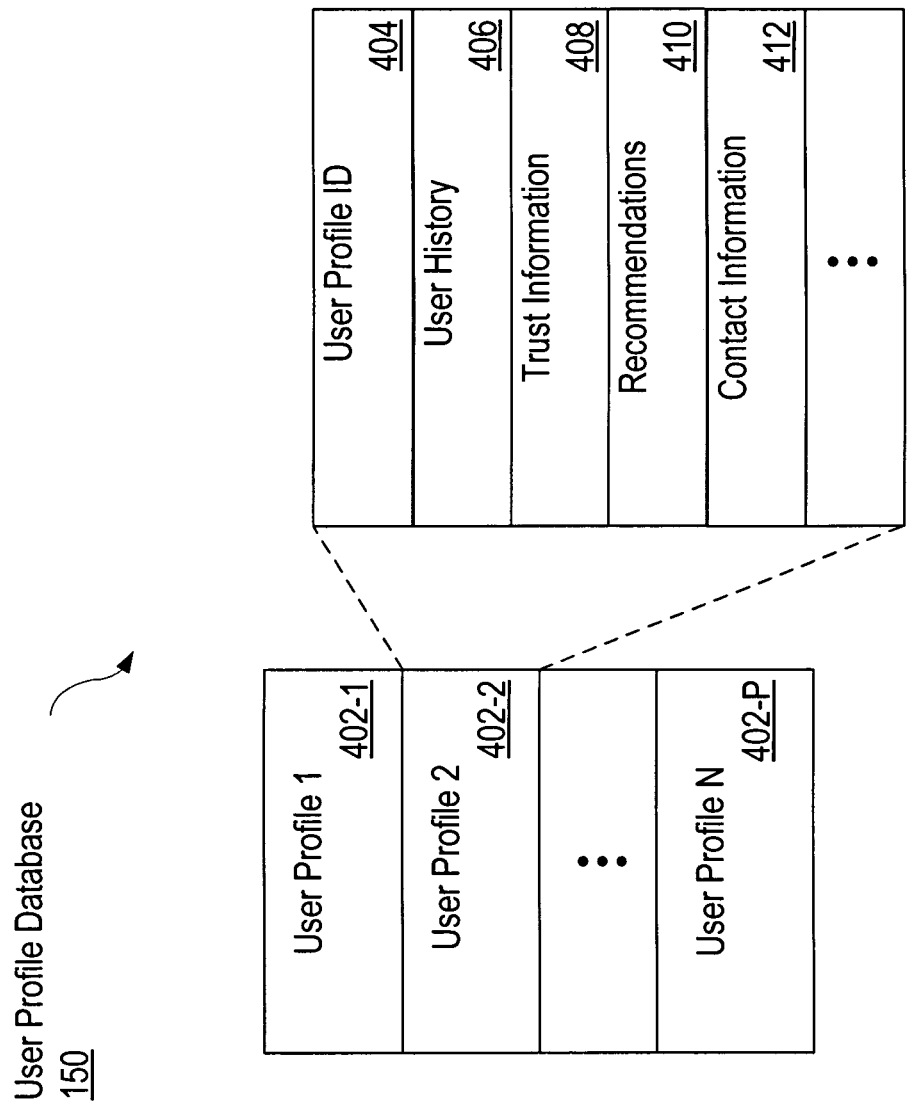
FIG. 4 depicts a block diagram of an exemplary data structure for a user profile database for storing information related to users of the server system.

FIG. 4 depicts a block diagram of an exemplary data structure for a user profile database 130 for storing information related to users of the server system (FIG. 1, 120). In accordance with some implementations, the user profile database 130 includes a plurality of user profiles 402-1 to 402-P, each of which corresponds to a user registered with the server system (FIG. 1, 120). In some implementations, each user profile 402 contains a user profile ID 404, a user history 406, trust information 408, recommendations 410 made by the user, and user contact information 412.

In some implementations, user profile ID 404 is a value that uniquely identifies a specific user of the server system (FIG. 1, 120). In some implementations, this value is chosen by the user and is a user name. In other implementations, this value is assigned to the user by the server system (FIG. 1, 120) as part of the registration process.

In some implementations, the user history 406 stores a history of the user's past interactions with the server system (FIG. 1, 120) including past user purchases, searches, page views, previous product recommendations, previous product reviews, and social connections of the user including previously recorded trust information for other users and/or social information received from social networking sites.

In some implementations, trust information 408 includes data describing the social connections of the user and includes a trust level for other users of the server system (FIG. 1, 120). A trust level is a value representing the degree to which a user trusts the opinions and recommendations of another user. In some implementations, trust information is explicitly submitted by the users, in other situations the server system (FIG. 1, 120) infers trust information from the actions of users, and in yet other situations trust information includes information from both user submissions and server inferences.

In some implementations, recommendation 410 data includes product purchases and product recommendations previously submitted by the user. In some implementations, contact information 412 includes a list of contact information for contacting the user through a plurality of communication methods and information describing if and when the server system (FIG. 1, 120) should use that method. For example, the contact information 412 includes an email address, a phone number, and a social network ID for the user. The user may select that the server system (FIG. 1, 120) should never use social network messaging to contact to user and should use email address at all times except for the weekend and that a text message to a mobile phone should be used on the weekend. In some implementations, the contact information 412 includes login and password information for one or more social networking sites.

Figure 5:
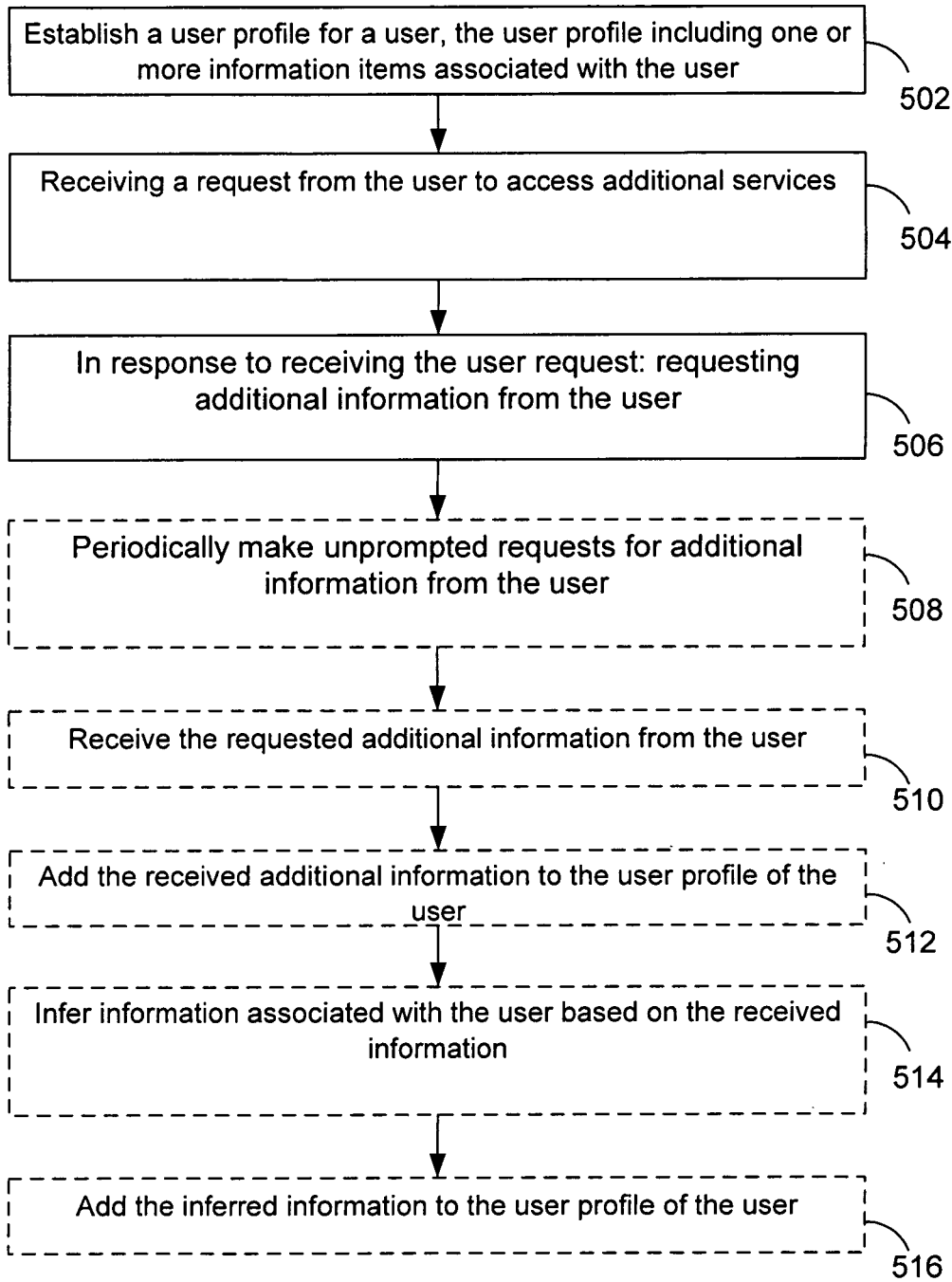
FIG. 5 is a flow diagram illustrating the process for requesting user data in accordance with some implementations.

FIG. 5 is a flow diagram illustrating the process for requesting user data in accordance with some implementations. Each of the operations shown in FIG. 5 may correspond to instructions stored in a computer memory or computer readable storage medium. Optional operations are indicated by dashed lines (e.g., boxes with dashed-line borders). In some implementations, the method described in FIG. 5 is performed by the server system (FIG. 1, 120).

In some implementations, the server system (FIG. 1, 120) establishing a user profile (FIG. 4, 402) for a user (502). The user profile 402 includes one or more information items associated with the user (e.g., user history 406, contact information 412, etc.). In some implementations, the user profile is established when the user signs up for the online service that the server system 120 operates.

In some implementations, the server system (FIG. 1, 120) receives a request from the user to access additional services (504). For example, the server system 120 receives a communication from the user to recommend another user, recommend a good or service, or to purchase a good or service.

In some implementations, in response to receiving the user request, the server system (FIG. 1, 120) requesting additional information from the user (506). For example, if the request is a product recommendation, the server system 120 can ask the user to identify a user, within or without the online service that the server system 120 operates, that referred a product to the user making the request. In some implementations, requesting additional information from the user includes requesting information needed to fulfill the user request (508). For example, if the request is a request to purchase a good, the server system 120 sends communications to the user requesting that the user provide any information that is needed to make the purchase transaction but are not in the server system 120.

In some implementations, requesting additional information from the user includes requesting that the user confirm information associated with the user obtained from an information source. The server system 120 extracts information associated with the user that is obtained from a content host 160 (e.g., a third-party social network), and server system 120 asks the user to confirm the extracted information. For example, if the request is a product recommendation, the server system 120 can extract information about the product from content hosts 160 and asks the user to confirm the information. As another example, if the request is a purchase request, the server system 120 can look in the user profile database 130 for the user's past transactions, extract information from the past transactions that is relevant to the request, and ask the user to confirm that the extracted information is still valid. In some implementations, the information source is, for example, an online presence of the user, social network activity of the user, a communications history of the user, or a requests history of the user.

In some implementations, requesting additional information from the user includes requesting additional information from the user in accordance with a predefined information request sequence. The sequence can be defined, for example, by a state diagram, decision tree, or the like. With respect to a particular user profile 402, the location and path within the state diagram or decision tree is based on, for example, how much and what information is in the user profile, if the user is making a request, and the type of request, if any.

In some implementations, the server system 120 periodically makes unprompted requests for additional information from the user (508). For example, the server system 120 periodically presents a solicitation of information to the user. The solicitation is not prompted by a specific user request. In some implementations, the unprompted requests are dictated by the state diagram or decision tree described above based on what information is already in the user profile.

In some implementations, the server system 120 receives the requested additional information from the user (510), and adds the received additional information to the user profile of the user (512). In some implementations, the server system 120 infers information associated with the user based on the received information (514), and adds the inferred information to the user profile of the user (516).

Figure 6:
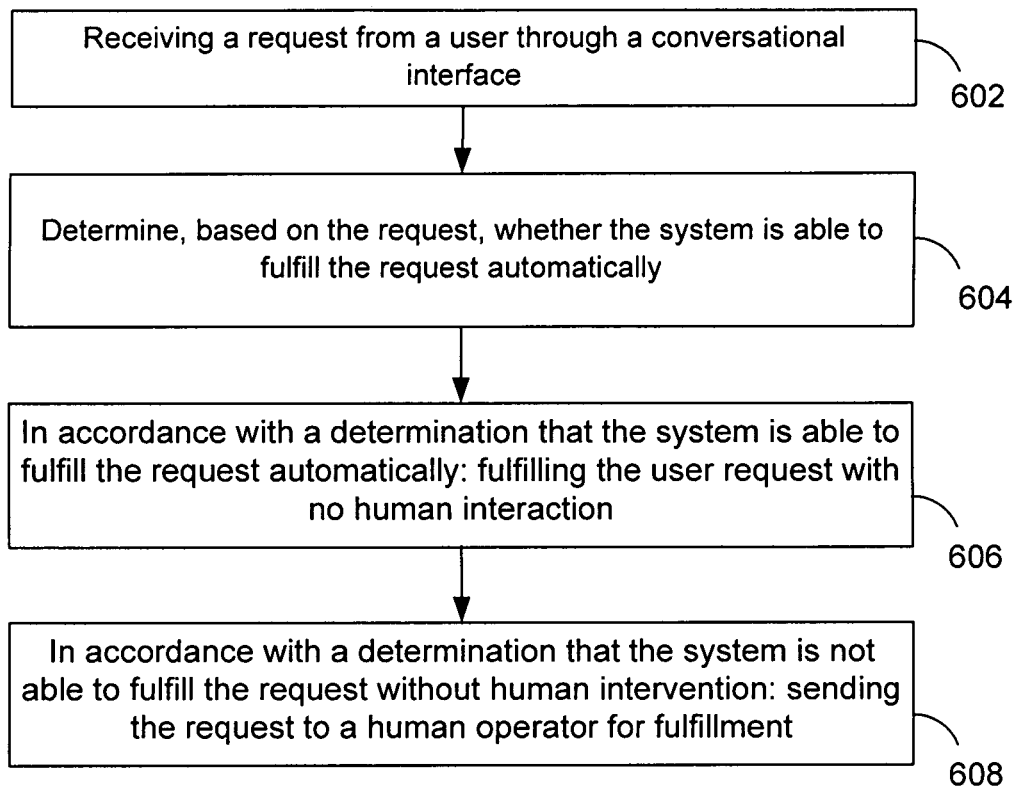
FIG. 6 is a flow diagram illustrating the process for responding to requests submitted through a conversational interface in accordance with some implementations.

FIG. 6 is a flow diagram illustrating the process for of responding to requests submitted through a conversational interface in accordance with some implementations. Each of the operations shown in FIG. 6 may correspond to instructions stored in a computer memory or computer readable storage medium. Optional operations are indicated by dashed lines (e.g., boxes with dashed-line borders). In some implementations, the method described in FIG. 6 is performed by the server system (FIG. 1, 120).

In accordance with some implementations, the server system (FIG. 1, 120) receives a request from a user through a conversational interface (602). The server system determines, based on the request, whether the system is able to fulfill the request automatically (604). The server system 120 and a user of the client system 102 exchange communications, in which the user conveys a request (e.g., a purchase, a recommendation, etc.) and the server system 120 receives the communications and determines the type of request the user is conveying and whether fulfillment of the request can be performed automatically, without human intervention.

In some implementations, determining whether the system is able to fulfill the request automatically includes, in accordance with a determination that a type of the request is ambiguous based on contents of the request, determining that the system is not able to fulfill the request without human intervention. For example, if the communication conveying the request has ambiguity (e.g., ambiguity regarding the type of request, ambiguity regarding information needed to fulfill the request), the request is determined to require human intervention for fulfillment.

In some implementations, determining whether the system is able to fulfill the request automatically includes, in accordance with a determination that one or more information items needed to fulfill the request requires in-person confirmation by the user, determining that the system is not able to fulfill the request without human intervention. For example, if the information needed for fulfilling the request includes sensitive information that is not already in the user profile, the server system 120 determines that the request requires a human administrator to communicate to the user in person (e.g., by phone, by video conference) to obtain and/or confirm the sensitive information.

In accordance with a determination that the system is able to fulfill the request automatically, the server system 120 fulfills the user request with no human interaction (606). For example, if the request is unambiguous and the server system 120 has all of the information needed to fulfill the request, the server system 120 fulfills the request without forwarding the request to a human administrator for fulfillment.

In accordance with a determination that the system is not able to fulfill the request without human intervention, the server system 120 sends the request to a human operator for fulfillment (608).

Figure 7:
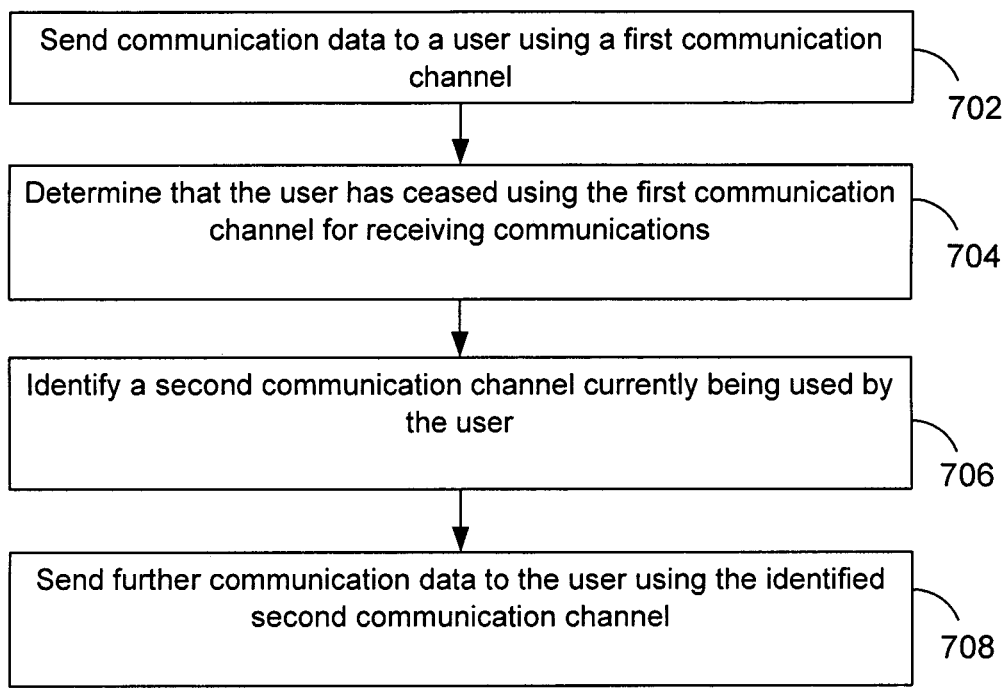
FIG. 7 is a flow diagram illustrating the process for enabling communication with a user in accordance with some implementations.

FIG. 7 is a flow diagram illustrating the process for enabling communication with a user in accordance with some implementations. Each of the operations shown in FIG. 7 may correspond to instructions stored in a computer memory or computer readable storage medium. Optional operations are indicated by dashed lines (e.g., boxes with dashed-line borders). In some implementations, the method described in FIG. 7 is performed by the server system (FIG. 1, 120).

In accordance with some implementations, the server system (FIG. 1, 120), sends communication data to a user using a first communication channel (702). The server system 120 determines that the user has ceased using the first communication channel for receiving communications (704). The server system 120 identifies a second communication channel currently being used by the user (706). The server system 120 sends further communication data to the user using the identified second communication channel (708).

Thus, for example, the server system 120 sends a communication to the user at the client system 102 using, for example, instant messaging. The server system 120 then determines that the user has ceased using instant messaging. The server system 120 identifies another communication channel (e.g., email), and sends future communications to the user using that another communication channel.

In some implementations, the first or the second communication channel is any of: email, chat messaging, text messaging, social networking, a website, message boards, voice communication (e.g., telephony, voicemail, voice over Internet Protocol, etc.), and video conferencing.

In some implementations, determining that the user has ceased using the first communication channel for receiving communication includes receiving a communication from the user on a communication channel different from the first communication channel. In some implementations, identifying the second communication channel includes identifying the communication channel at which the communication was received as the second communication channel. For example, if the server system 120 sends a communication to the user using the first communication channel and the user replies back using a communication channel different from the first communication channel, the server system 120 determines that the user has ceased using the first communication channel and has switched to a different communication channel. That different communication channel is identified as the second communication channel.

In some implementations, determining that the user has ceased using the first communication channel receiving communication includes determining, in accordance with a schedule, that the user desires to receive communication at a communication channel different from the first communication channel. In some implementations, identifying the second communication channel includes identifying the second communication channel in accordance with the schedule. For example, the user profile for a user may have data specifying a schedule when particular communications channels are preferred. Alternatively, such a schedule may be predefined system-wide behavior for the server system 120. The user's preferred communication channel for receiving communication changes with the time of day in accordance with the schedule, and the second communication channel is determined in accordance with the schedule as well.

In some implementations, determining that the user has ceased using the first communication channel receiving communication includes detecting a log-out by the user from the first communication channel. For example, if the server system 120 and the user is communicating through a channel within the system (e.g., instant messaging in a web site operated by the server system 120) and the user logs out from the channel (e.g., the user logs out from the web site), the server system 120 determines that the user has cease using the channel within the system for communications and proceeds to switch to another channel (e.g., email).

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present implementations. The first contact and the second contact are both contacts, but they are not the same contact.

The terminology used in the description of the implementations herein is for the purpose of describing particular implementations only and is not intended to be limiting. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

What is claimed is:

1. A method of responding to requests submitted through a conversational interface, the method comprising:

at a computer system having one or more processors and memory storing one or more programs for execution by the one or more processors:

receiving a request from a user using natural language through the conversational interface of an online commerce system, wherein the request comprises one of (1) a purchase request for a product or a service or (2) a recommendation request for the product or the service, and wherein the conversational interface comprises at least one communication channel comprising one or more of a website, an email, an instant message, a short message service (SMS) message, a social network post, or a voice communication;

determining, based on the request, whether the computer system is able to fulfill the request automatically;

in response to a determination that the computer system is able to fulfill the request automatically: fulfilling the request with no human interaction; and in response to a determination that the computer system is not able to fulfill the request without human intervention: sending the request to a human operator for fulfillment, wherein:

determining whether the computer system is able to fulfill the request automatically comprises, in response to a determination that a type of the request is ambiguous based on contents of the request:

determining that the computer system is able to fulfill the request without the human intervention;

detecting what information is missing from the request;

sending a message to the user through the conversational interface asking for the information that is missing from the request;

receiving the information that is missing from the request from the user through the conversational interface; and fulfilling the request with no human interaction.

2. The method of claim 1, wherein determining whether the computer system is able to fulfill the request automatically comprises:

in response to a determination that one or more information items needed to fulfill the request requires in-person confirmation by the user, determining that the computer system is not able to fulfill the request without the human intervention.

3. The method of claim 1, wherein determining whether the computer system is able to fulfill the request automatically comprises:

in response to a determination that one or more information items needed to fulfill the request requires sensitive information, the sensitive information comprising credit card information, determining that the computer system is not able to fulfill the request without the human intervention.

4. The method of claim 1, further comprising:

receiving an additional request from the user to access additional services;

in response to receiving the additional request from the user, requesting first additional information from the user;

periodically requesting second additional information from the user in one or more unprompted requests;

in response to the one or more unprompted requests, receiving the second additional information from the user;

adding the second additional information to a user profile of the user;

inferring third additional information associated with the user based on at least one of the first additional information or the second additional information; and adding the third additional information to the user profile of the user.

5. The method of claim 1, wherein:
the conversational interface comprises a first communication channel, the at least one communication channel comprising the first communication channel, the first communication channel comprising one of the website, the email, the instant message, the SMS message, the social network post, or the voice communication; and
the method further comprises:
determining the user has ceased using the first communication channel;
identifying a second communication channel being used by the user, the at least one communication channel comprising the second communication channel, the second communication channel comprising a different one of the website, the email, the instant message, the SMS message, the social network post, or the voice communication of the first communication channel; and
sending further communication data through the second communication channel.

6. The method of claim 1, wherein:
determining whether the computer system is able to fulfill the request automatically comprises:
in response to a determination that one or more information items needed to fulfill the request requires in-person confirmation by the user, determining that the computer system is not able to fulfill the request without the human intervention; and
in response to a determination that the one or more information items needed to fulfill the request requires sensitive information, the sensitive information comprising credit card information, determining that the computer system is not able to fulfill the request without the human intervention;
the conversational interface comprises a first communication channel, the at least one communication channel comprising the first communication channel, the first communication channel comprising one of the website, the email, the instant message, the SMS message, the social network post, or the voice communication; and
the method further comprises:
receiving an additional request from the user to access additional services;
in response to receiving the additional request from the user, requesting first additional information from the user;
periodically requesting second additional information from the user in one or more unprompted requests;
in response to the one or more unprompted requests, receiving the second additional information from the user;
adding the second additional information to a user profile of the user;
inferring third additional information associated with the user based on at least one of the first additional information or the second additional information;
adding the third additional information to the user profile of the user;
determining the user has ceased using the first communication channel;
identifying a second communication channel being used by the user, the at least one communication channel comprising the second communication channel, the second communication channel comprising a different one of the website, the email, the instant message, the SMS message, the social network post, or the voice communication of the first communication channel; and
sending further communication data through the second communication channel.

7. A server system for requesting user data, comprising:
one or more processors; and
memory storing one or more programs to be executed by the one or more processors;
the one or more programs comprising instructions for:
receiving a request from a user using natural language through a conversational interface of an online commerce system, wherein the request comprises one of (1) a purchase request for a product or a service or (2) a recommendation request for the product or the service, and wherein the conversational interface comprises at least one communication channel comprising one or more of a website, an email, an instant message, a short message service (SMS) message, a social network post, or a voice communication;
determining, based on the request, whether the server system is able to fulfill the request automatically;
in response to a determination that the server system is able to fulfill the request automatically: fulfilling the request with no human interaction;
in response to a determination that the server system is not able to fulfill the request without human intervention: sending the request to a human operator for fulfillment; and
in response to a determination that a type of the request is ambiguous based on contents of the request:
determining that the server system is able to fulfill the request without the human intervention;
detecting what information is missing from the request;
sending a message to the user through the conversational interface asking for the information that is missing from the request;
receiving the information that is missing from the request from the user through the conversational interface; and
fulfilling the request with no human interaction.

8. The server system of claim 7, comprising instructions for:
in response to a determination that one or more information items needed to fulfill the request requires in-person confirmation by the user, determining that the server system is not able to fulfill the request without the human intervention.

9. The server system of claim 7, comprising instructions for:
in response to a determination that one or more information items needed to fulfill the request requires sensitive information, the sensitive information comprising credit card information, determining that the server system is not able to fulfill the request without the human intervention.

10. The server system of claim 7, further comprising instructions for:
receiving an additional request from the user to access additional services;
in response to receiving the additional request from the user, requesting first additional information from the user;
periodically requesting second additional information from the user in one or more unprompted requests;
in response to the one or more unprompted requests, receiving the second additional information from the user;

adding the second additional information to a user profile of the user;

inferring third additional information associated with the user based on at least one of the first additional information or the second additional information; and adding the third additional information to the user profile of the user.

11. The server system of claim 7, wherein:

the conversational interface comprises a first communication channel, the at least one communication channel comprising the first communication channel, the first communication channel comprising one of the website, the email, the instant message, the SMS message, the social network post, or the voice communication; and the server system further comprises instructions for:

determining the user has ceased using the first communication channel;

identifying a second communication channel being used by the user, the at least one communication channel comprising the second communication channel, the second communication channel comprising a different one of the website, the email, the instant message, the SMS message, the social network post, or the voice communication of the first communication channel; and sending further communication data through the second communication channel.

12. The server system of claim 7, wherein:

the conversational interface comprises a first communication channel, the at least one communication channel comprising the first communication channel, the first communication channel comprising one of the website, the email, the instant message, the SMS message, the social network post, or the voice communication; and the server system further comprises instructions for:

in response to a determination that one or more information items needed to fulfill the request requires in-person confirmation by the user, determining that the server system is not able to fulfill the request without the human intervention;

in response to a determination that the one or more information items needed to fulfill the request requires sensitive information, the sensitive information comprising credit card information, determining that the server system is not able to fulfill the request without the human intervention;

receiving an additional request from the user to access additional services;

in response to receiving the additional request from the user, requesting first additional information from the user;

periodically requesting second additional information from the user in one or more unprompted requests;

in response to the one or more unprompted requests, receiving the second additional information from the user;

adding the second additional information to a user profile of the user;

inferring third additional information associated with the user based on at least one of the first additional information or the second additional information;

adding the third additional information to the user profile of the user;

determining the user has ceased using the first communication channel;

identifying a second communication channel being used by the user, the at least one communication channel comprising the second communication channel, the second communication channel comprising a different one of the website, the email, the instant message, the SMS message, the social network post, or the voice communication of the first communication channel; and sending further communication data through the second communication channel.

13. A non-transitory computer readable storage medium storing one or more programs configured for execution by a server system, the one or more programs comprising instructions for:

receiving a request from a user using natural language through a conversational interface of an online commerce system, wherein the request comprises one of (1) a purchase request for a product or a service or (2) a recommendation request for the product or the service, and wherein the conversational interface comprises at least one communication channel comprising one or more of a website, an email, an instant message, a short message service (SMS) message, a social network post, or a voice communication;

determining, based on the request, whether the server system is able to fulfill the request automatically;

in accordance with a determination that the server system is able to fulfill the request automatically: fulfilling the request with no human interaction;

in accordance with a determination that the server system is not able to fulfill the request without human intervention: sending the request to a human operator for fulfillment;

and in accordance with a determination that a type of the request is ambiguous based on contents of the request:

determining that the server system is able to fulfill the request without the human intervention;

detecting what information is missing from the request;

sending a message to the user through the conversational interface asking for the information that is missing from the request;

receiving the information that is missing from the request from the user through the conversational interface; and fulfilling the request with no human interaction.

14. The non-transitory computer readable storage medium of claim 13, wherein:

the conversational interface comprises a first communication channel, the at least one communication channel comprising the first communication channel, the first communication channel comprising one of the website, the email, the instant message, the SMS message, the social network post, or the voice communication; and the non-transitory computer readable storage medium further comprises instructions for:

determining the user has ceased using the first communication channel;

identifying a second communication channel being used by the user, the at least one communication channel comprising the second communication channel, the second communication channel comprising a different one of the website, the email, the instant message, the SMS message, the social network post, or the voice communication of the first communication channel; and sending further communication data through the second communication channel.

15. The non-transitory computer readable storage medium of claim 13, wherein:

the conversational interface comprises a first communication channel, the at least one communication channel comprising the first communication channel, the first communication channel comprising one of the website, the email, the instant message, the SMS message, the social network post, or the voice communication; and the non-transitory computer readable storage medium further comprises instructions for:

in accordance with a determination that the one or more information items needed to fulfill the request requires sensitive information, the sensitive information comprising credit card information, determining that the server system is not able to fulfill the request without the human intervention;

in accordance with a determination that one or more information items needed to fulfill the request requires in-person confirmation by the user, determining that the server system is not able to fulfill the request without the human intervention;

receiving an additional request from the user to access additional services;

in response to receiving the additional request from the user, requesting first additional information from the user;

periodically requesting second additional information from the user in one or more unprompted requests;

in response to the one or more unprompted requests, receiving the second additional information from the user;

adding the second additional information to a user profile of the user;

inferring third additional information associated with the user based on at least one of the first additional information or the second additional information;

adding the third additional information to the user profile of the user;

determining the user has ceased using the first communication channel;

identifying a second communication channel being used by the user, the at least one communication channel comprising the second communication channel, the second communication channel comprising a different one of the website, the email, the instant message, the SMS message, the social network post, or the voice communication of the first communication channel; and sending further communication data through the second communication channel.

16. The non-transitory computer readable storage medium of claim 13, comprising further instructions for:

receiving an additional request from the user to access additional services;

in response to receiving the additional request from the user, requesting first additional information from the user;

periodically requesting second additional information from the user in one or more unprompted requests;

in response to the one or more unprompted requests, receiving the second additional information from the user;

adding the second additional information to a user profile of the user;

inferring third additional information associated with the user based on at least one of the first additional information or the second additional information; and adding the third additional information to the user profile of the user.

17. The non-transitory computer readable storage medium of claim 13, comprising instructions for:

in accordance with a determination that one or more information items needed to fulfill the request requires in-person confirmation by the user, determining that the server system is not able to fulfill the request without the human intervention.

18. The non-transitory computer readable storage medium of claim 13, comprising instructions for:

in accordance with a determination that one or more information items needed to fulfill the request requires sensitive information, the sensitive information comprising credit card information, determining that the server system is not able to fulfill the request without the human intervention.

* * * * *